Sept. 16, 1969 G. C. BRUMLIK 3,466,759
MOLECULAR MODEL ASSEMBLY
Filed June 12, 1967 2 Sheets-Sheet 1
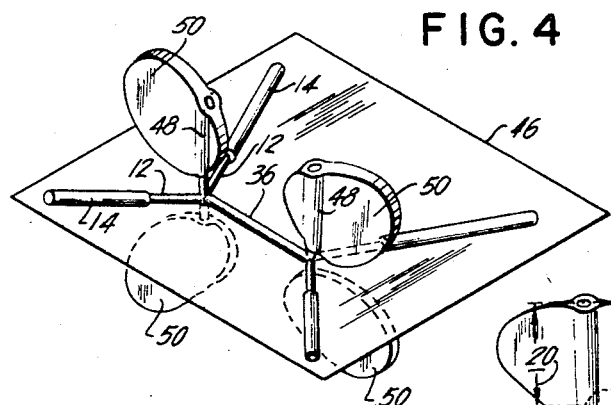
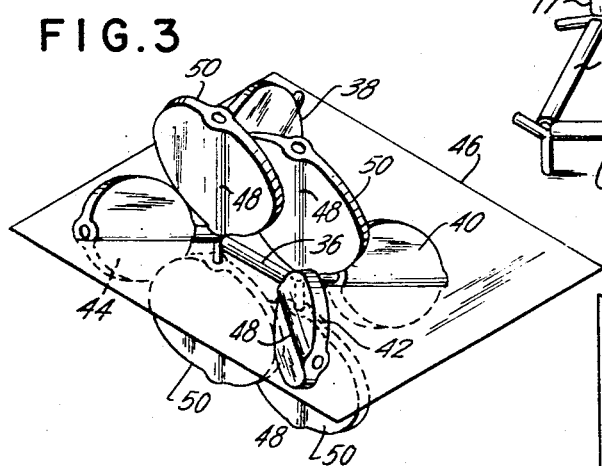
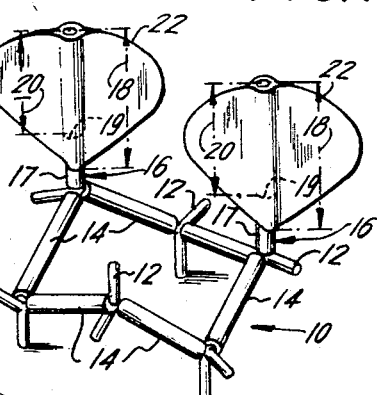
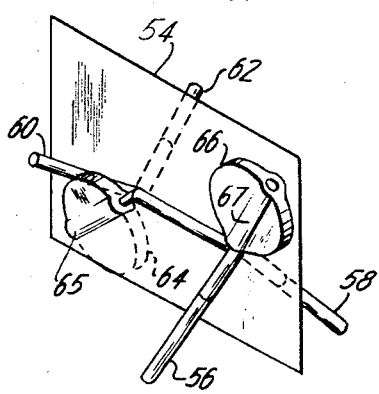
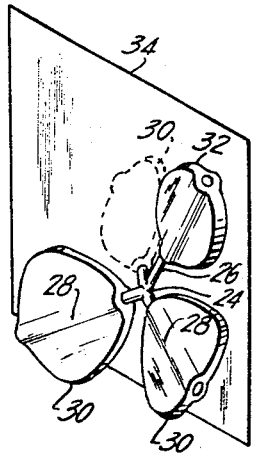
INVENTOR.
GEORGE C. BRUMLIK
BY
Edward F. Levy
ATTORNEY Sept. 16, 1969      G. C. BRUMLIK      3,466,759
MOLECULAR MODEL ASSEMBLY
Filed June 12, 1967      2 Sheets-Sheet 2
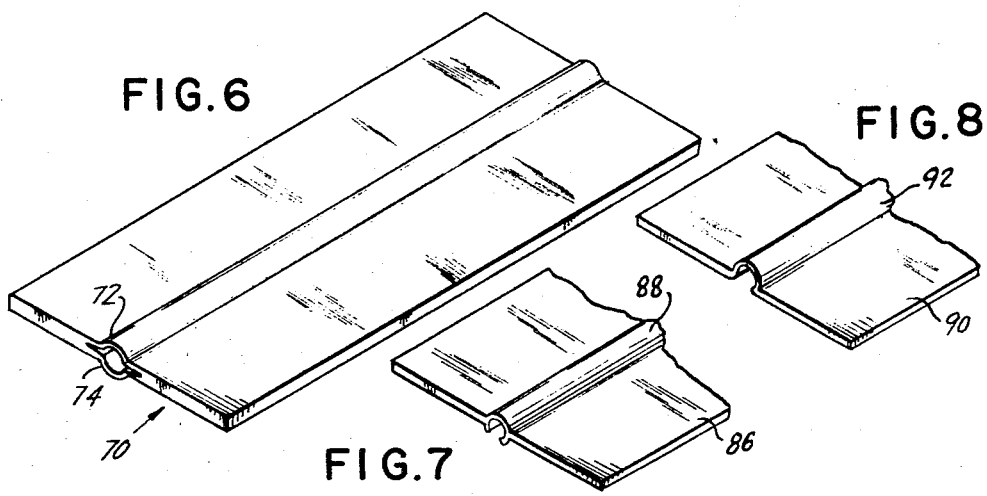
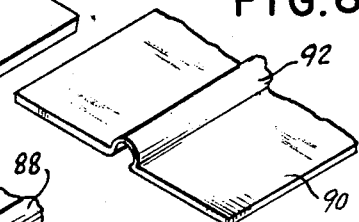
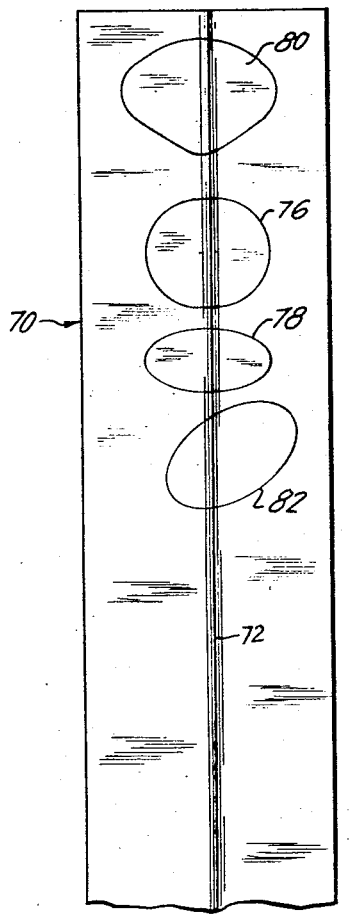
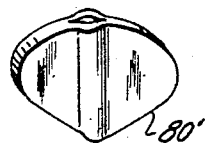
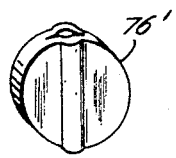
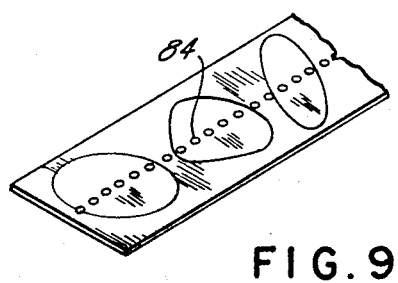
INVENTOR.
GEORGE C. BRUMLIK
BY Edward F. Roy
ATTORNEY

United States Patent Office 3,466,759
Patented Sept. 16, 1969

3,466,759
MOLECULAR MODEL ASSEMBLY
George C. Brumlik, 154 Upper Mountain Ave.,
Montclair, N.J. 07042
Filed June 12, 1967, Ser. No. 645,244
Int. Cl. G09b 23/26, 23/04
U.S. Cl. 35—18                                    5 Claims

ABSTRACT OF THE DISCLOSURE

A molecular model assembly composed of a framework structure of elongated cylindrical sections projecting from central points representing centers of atoms and extending therefrom at angles representing symmetry axes of valence orbitals and bond angles of central atoms, and space filling structures mounted on selected sections to represent volume orbitals. The space filling structures are flat and have planar surfaces corresponding to cross-sections of the three dimensional space-filling geometry of designated orbitals, and are rotatably mounted on said cylindrical sections to determine overlap of the orbitals represented as well as to depict anti-bonding lobes of molecules in an excited state.

---

According to these modern concepts of valence, molecular structures, and molecular orbitals, a fully saturated atom, i.e., one which is bonded to other atoms only by sigma bonds and carries no unshared electron pairs, is spherical, the radius of the sphere being termed the covalent radius. In a non-fully saturated atom there are present electronic orbital lobes which extend in geometric patterns from the surface of the covalent core of the atom beyond such core. These lobes are generated by unshared electron pairs, a lone electron, or by electrons which have polynuclear pi orbitals. Sigma bond orbitals, which essentially are located between the atoms which are united thereby do not contribute to the molecular volume although they do affect the size of the covalent core of the atom.

Molecular models have been devised to depict accurately the size, volume, and spatial relationships of atomic and molecular orbitals, such models being two types. In my prior U.S. Patent No. 3,080,662, issued Mar. 12, 1963, I have disclosed molecular models which include molecular and atomic orbitals made in a three-dimensional solid form to approximate the actual configuration of the molecular geometry. Components of this model set include solid spherical, ellipso-conical and frusto-conical members, for example. These solid components, when assembled together to form a completed model, interfit closely and precisely to form structures of solid parts which are "space-filling" molecular models. The latter models offer the advantage of visually presenting an accurate molecular shape and geometry, but have the disadvantage of providing an outer configuration which is so bulky as to obscure the inner structural details of the molecule.

The second type molecular orbital model is shown and described in my U.S. patent application, Ser. No. 356,546, now issued as U.S. Patent No. 3,333,349, and is termed a "framework" molecular orbital model assembly. This type of model has a framework construction which outlines the orientation of the axes of symmetry and planes of symmetry of atomic and molecular orbitals in three-dimensions and illustrates, on a relative scale, the extent to which the orbitals extend into molecular space. In this type of model, elongated tubular members are interconnected by angular couplings and are arranged such that the bond angles may be selectively varied and the distance between atoms and the relative sizes of atoms may be accurately depicted. By various colorations of the tubular members, correspondingly various different atoms can be represented, the length of the tubular members being respectively chosen to depict according to precise scale, the sigma bond distances between bonded atoms, the Van der Waals radii of unshared electron pair orbitals, pi orbitals, etc., such factors being difficult to observe in the hereinabove referred to "space filling" models.

In my co-pending U.S. application Ser. No. 499,865, now issued as U.S. Patent No. 3,355,820, there is shown a molecular orbital model assembly in which there is provided all of the advantages of both the "space-filling" and "framework" types of molecular orbital model sets. This model assembly comprises a framework structure and a plurality of space-filling members adapted to be mounted thereon to convert the framework structure into a molecular model. The framework structure comprises a plurality of elongated cylindrical sections which meet at a central point that represents the center of an atom and extends outwardly therefrom in accordance with the axis of symmetry of valence orbitals and bond angles of the central atom. The cylindrical sections have inner color-coded portions which represent according to a chosen scale the covalent radius of the central atom and outer color-coded portions representing the covalent radii and the Van der Waals radii of different atoms bonded to the central atom, each cylindrical section being dimensioned to represent accurately according to scale the sigma bond distances between the bonded atoms. The space-filling members respectively include sectioned spherical bodies representing central atoms, and having radii corresponding to the length of the inner color-coded portions of the cylindrical sections. These spherical bodies are adapted to be assembled over the inner joined ends of the cylindrical sections with their centers located at the respective central points, a spherical body covering over the inner colored portions.

Since, in a molecular orbital model in the latter type model set, a group of the cylindrical sections lie on a common plane, the sections of a spherical body are separated along a plane which conforms to the common plane of the cylindrical sections. Means are provided to releasably join together the sections of the cylindrical body such that a section can be removed to reveal the inner framework structure. Additional space-filling members are provided to be mounted on the cylindrical sections and to cover over the outer color-coded portions thereof, these additional space-filling members representing atoms bonded to the central atom, or molecular orbitals.

Inasmuch as the physical geometry of atoms essentially consists of free space, the use of the three-dimensional space-filling bodies as disclosed in the aforesaid application, Ser. No. 499,865, may prevent the representation of atoms in a molecular arrangement which are so close to each other such that when their orbitals are rotated they overlap. Thus, there cannot be accurately represented with the three-dimensional space-filling structures, the molecular pi orbitals formed by such overlapping atoms. Furthermore, the phenomenon of anti-bonding lobes which exist in a molecule when the molecule is in an excited state can also not be represented by a molecular model employing three-dimensional space-filling structures.

In considering the aforementioned patent and applications, it is appreciated that the respective frame and space-filling structures used therein to construct molecular models of necessity require particular equipments for their fabrication. As such, these structures practicably, have to be purchased or otherwise obtained by the user thereof in their completed forms, the user assembling them into particular molecular models.

Accordingly, it is an important object of this invention to provide a molecular model which is capable of representing the volume orbitals therein, of demonstrating their spatial arrangements and interactions, and of showing overlapping of such orbitals, when pertinent, upon the rotation of these orbitals.

It is another object to provide a molecular model in accordance with the preceding object wherein there is enabled the representation of a molecule in its excited state, i.e., the representation of anti-bonding orbital lobes.

It is a further object to provide a molecular model in accordance with the preceding objects whose various structures are readily constructed and assembled into the model by the user thereof.

It is still another object to provide means for readily providing the framework and space-filling structures for constructing a molecular model in accordance with the preceding objects.

In accordance with an illustrative embodiment of the invention, there is provided a molecular model assembly comprising a framework structure and a plurality of substantially planar space-filling members on said framework to provide said molecular model. The framework structure comprises a plurality of elongated cylindrical sections which meet at a central point which represents the center of an atom and which extend outwardly therefrom in accordance with the symmetry axes of valence orbitals and bond angles of such central atom. The cylindrical sections advantageously comprise inner color-coded portions which represent in accordance with a chosen scale the covalent radius of the central atom, and outer color-coded portions which represent the covalent radii and Van der Waals radii of different atoms bonded to the central atom. Each cylindrical section is dimensioned to relatively precisely represent to scale, the bond distances between the bonded atoms.

The space-filling structures on the model comprise planar members having surface contours shaped to respectively represent sections of three-dimensional bodies which are configured according to the geometry of atomic orbitals. These latter structures are so dimensioned whereby their axial lengths are equal to the sums of the lengths of their covalent radii and their Van der Waals radii and accordingly when mounted on the cylindrical sections cover over the outer color-coded portions thereof. The space-filling structures can represent the orbitals of the atoms bonded to the central atom and/or molecular orbitals, i.e., the pi orbitals of overlapping atomic orbitals.

Additional objects and advantages of the invention will become apparant during the course of the following specification when taken in connection with the accompanying drawings in which:

FIGS. 1 to 5 are three-dimensional views of examples of molecular models constructed according to the invention;

FIGS. 6 to 9 are examples of blanks suitable for use in constructing the structures representing orbital lobes in the molecular models;

FIG. 10 is a plan view of the blank shown in FIG. 6 and depicts the mode of constructing the orbital lobe structures therefrom; and FIGS. 11 to 13 are three-dimensional views of respective structures cut from the blank as shown in FIG. 10.

Referring now to FIG. 1, there is shown therein a framework, generally designated by the numeral 10, which comprises a plurality of coupling elements, each bearing the numeral 12. Coupling elements 12 are intended to represent valence clusters and suitably respectively consist of thin rigid cylindrical bars which meet together at a central junction point which constitutes the center of an atom. The cylindrical bars are spatially disposed along the axes of symmetry of the atomic valence orbitals and the angles at which they are disposed accurately represent valence bond angles in the assembled molecular models. In a preferred form the valence cluster elements 12 may suitably consist of metal arm sections of relatively small diameter which are joined at their ends at a common point, i.e., the point which represents the center of the atom, whereby they faithfully retain their shape.

The atoms are interconnected by sections of tubing, respectively designated by the numeral 14. Tubing sections 14 are chosen lengths according to a selected scale such as, for example, within the range of 5 mm./angstrom unit to 100 mm./angstrom unit to relatively precisely represent the bond distances between atoms. Tubing sections 14 may advantageously be colored in accordance with a chosen atomic coding. Thus, for example, the color black may be used to represen carbon atoms, white may be used for hydrogen, and red, blue and yellow, etc. for example, may be employed to respectively depict oxygen, nitrogen, sulfur atoms, etc.

The framework structure 10 shown in FIG. 1 depicts the cyclohexane molecule. The central points valence clusters 12 accordingly represent the carbon atoms in this molecule and two arms of each of these clusters are utilized to receive the tubings for bond connecting them to adjacent carbon atoms. The remaining two arms of each valence cluster receive respective tubing lengths which represents the respective bondings between each carbon atom and their attached hydrogen atoms. Such tubing lengths are shown for only one hydrogen atom in two of the carbon atoms and are respectively designated with the numerals 16. If it is assumed that in the color code which is selected, carbon atoms are assigned the color black and hydrogen atoms are assigned the color white, then respective portions 17 of tubing lengths 16 are black to indicate the bond length of the carbon atom and portions 18 of lengths 16 are white to indicate the bond lengths of the hydrogen atoms.

On portions 18, transverse lines 19, although not necessarily appearing in the actual structure, indicate the locations of the hydrogen nuclei. The remaining lengths 20 of portions 18 represent the Van der Waals radii of the hydrogen atoms.

The structures 22 are planar members whose surfaces correspond to cross-sections of the three dimensional space-filling geometry of the orbitals of the hydrogen atoms. It is seen that structures 22 each have a longitudinal axis, i.e. on which the hydrogen bonds are disposed, such axis being equal to the length of the covalent bond of the hydrogen atom and the length of the Van der Waals radius. The upper portion of a structure 22 is of semiellipsoidal configuration whose major axis is the widest transverse dimension of such structure, the remainder of the structure tapering down to a point located at the terminus of the vocalent bond of the central carbon atom, i.e., the terminus of portion 17. It is thus seen that structure 22 has a surface configuration which is the cross-section of a three-dimensional orbital lobe, such lobe being shown in its three-dimensional form in my aforementioned Patent 3,080,662.

It is, of course, appreciated that to complete the cyclohexane molecule shown in FIG. 1, tubing sections having properly mounted thereon respective structures 22 are provided for all twelve hydrogen atoms in the molecule, the tubing being inserted on the other valence cluster elements provided thereof. With such complete molecule, there can now be observed the distances and relationship between the respective hydrogen atom orbitals. Structures 22 can be rotated to indicate whether these orbitals overlap to form pi molecular orbitals.

Thus, with the arrangement shown in FIG. 1, utilizing planar orbital structures 22, there is enabled the representation and observation of the dynamics of atomic and molecular orbitals which is not possible using three-dimensional space-filling models. It is to be noted that the arrangement in FIG. 1 depicts the cyclohxane molecule in the ground state and, as such, the axes of rotations of the orbital lobes are respectively symmetrically disposed, i.e., the tubing sections on which orbital depicting structures 22 are mounted divide the structures into two like moieties.

Suitably, structures 22 have the same color as the tubing sections on which they are mounted to maintain consistency in the use of the color coding. Thus, if the tubing sections upon which structures 22 are mounted is chosen to be white, i.e., the color chosen to depict hydrogen atoms, then structures 22 which are the orbital lobes of these hydrogen atoms are also chosen to be white.

In FIG. 2, there is shown an arrangement constructed in accordance with the principles of the invention which represents an ammonia molecule in the ground state whereby the orbital lobe structures mounted thereon are bisected thereby. The junction 24 of the tubing sections represents the nitrogen atom of the ammonia molecule. Tubing section portions 26 depict the covalent radii of the nitrogen bonds. Tubing section portions 28 represent the covalent and Van der Waals radii of the hydrogen atoms. Structures 30 similar to structures 22 in FIG. 1 depict the orbital lobes of the hydrogen atoms. Structure 32 represents an unshared electron pair, i.e., an $sp^3$ orbital, as is explained in the aforementioned Patent No. 3,080,-662. The outline 34 conceptually depicts a plane. If it is assumed that the central nitrogen atom is located in plane 34, then in FIG. 2 it can be seen that two hydrogen atoms and their associated respective orbitals are located in front of plane 34, that one hydrogen atom and the associated orbital is behind the plane, and that the $sp^3$ orbital is in front of the plane.

Consistent with the color-coding scheme described hereinabove, the tubing sections for the hydrogen atoms and their associated orbital structures 30 are colored white, the tubing sections representing the central nitrogen atom and its covalent radii may be blue color and the portion of tubing section 28 covered by planar structure 32, i.e., the representation of the $sp^3$ orbital and structure 32 may also be of blue color.

The molecular model shown in FIG. 3 represents the ethylene molecule in the ground state. In this model, it is seen that the central carbon atoms represented as covalently bonded by tubing section 36 each has attached thereto two hydrogen atoms. The orbitals of these hydrogen atoms are represented by structures 38, 40, 42 and 44 which suitably have the same surface configurations as structure 22 in FIG. 1 and structure 30 in FIG. 2. The orbitals are symmetrically mounted on tubing sections whose lengths respectively are precisely, according to scale, the sums of the lengths of the covalent and Van der Waals radii of the hydrogen atoms. The bonding axis between the carbon atoms and the bonding axes between the carbon and hydrogen atoms all lie in the plane as conceptually depicted by outline 46. In addition, pairs of sections of tubing designated by the numeral 48, extend from the two central carbon atoms above and below the plane 46. On tubing sections 48, there are bilaterally symmetrically mounted planar structures 50 which represent unshared electron pairs. It is seen in FIG. 3, that the orbitals of adjacent structures 50, because of the calculated geometry of the ethylene molecule overlaps to form molecular pi orbitals of generally elliptical configuration. Consistent with the color scheme outlined hereinabove, the tubing section portions representing the covalent bonding radii of the carbon atoms, the bond between the carbon atoms, the tubing sections 48 and the orbital representing structures 50 may be of black color and the portions of the tubing sections representing the covalent and Van der Waals radii of the hydrogen atoms and the orbital representing structures 38, 40, 42 and 44 may be of a white color.

FIG. 4 is also a representation of the ethylene molecule so that corresponding structures in FIGS. 3 and 4 have been designated with the same numerals respectively. For clarification of depicition, structures 38, 40, 42 and 44 have been omitted in FIG. 4. FIG. 4 shows a representation of the ethylene molecule in the excited state. When the molecule is in such state, it exhibits the phenomena of anti-bonding lobes. Such lobes, i.e., anti-bonding pi orbitals, in their three-dimensional nature, are representable by space-filling bodies that are asymmetrically disposed about their axes. The planar structures whose surface configurations are cross-sections of such asymmetrically axially disposed space-filling bodies 50 are mounted on the tubular sections 48 as shown in FIG. 4. With such arrangement it is seen that using the planar structures constructed in accordance with the principles of the invention, great flexibility is enabled in representing the geometries of excited molecules.

In FIG. 5, there is shown a representation of another type of an electronically and vibrationally excited state of ethylene using the model set according to the invention. In this representation, the central carbon atoms are structurally covalently bonded to each other by tubular sections. As seen in FIG. 5, tubular sections 56 and 58 which respectively represent the sums of the bonding radii of the rightmost carbon atom and the two hydrogen atoms bonded thereto extend downwardly and outwardly from this carbon atom respectively in front of and behind the plane 54 of the carbon atoms and the bond therebetween. Correspondingly, tubular sections 60 and 62, which respectively represent the sums of the bonding radii of the leftmost carbon atom and the two hydrogen atoms bonded thereto extend upwardly and outwardly from this leftmost carbon atom respectively in front of and behind plane 54. Planar structures 64 and 66 mounted on tubular sections 65 and 67 respectively have surface configurations in accordance with the cross-sections of three-dimensional space-filling members which represent $sp^3$ orbitals, i.e., containing an odd electron.

FIGS. 6–9 show embodiments of blanks from which there can readily be cut the planar structures, according to the invention, for representing the various types of orbitals, and adapted to be mounted on the tubular sections. The material of which the blanks consists is suitably a relatively strong thin sheet of plastic, suitably about 0.01 thick and of a material such as polypropylene.

Thus, the embodiment shown in FIG. 6 is a blank 70 which is essentially a thin sheet material of a suitable plastic. Opposing semi-circular ridges 72 and 74 are provided, preferably along the longer dimension of blank 70 intermediate the lateral edges thereof. Ridges 72 and 74 together define an open-ended circular bore, having a diameter so chosen as to relatively snugly receive a tubular section, as used in the model, therein. The ridges defining the bore may be formed by a molding process.

FIG. 10 depicts the method of providing the planar orbital structures from a blank such as blank 70. Thus, from blank 70, there can be cut orbital lobe structures for ground state molecular model representations, i.e., laterally symmetrical about the central bore of blank 70. Structure 76 which is of elliptical outline approximately represents a cross-section of a bonding lobe. Structure 78 which is of narrower elliptical outline represents a cross-section of a pi molecular orbital. Structure 80 is a relatively accurate representation of a bonding lobe which includes both a covalent radius and a Van der Waals radius. Structure 82 which is elliptical in outline, is cut out asymmetrically with respect to the central bore to have a non-symmetrical rotational axis and can represent the cross-section of an anti-bonding lobe.

The structures are readily cut from blank 70 by shears or other handy cutting instrument. FIGS. 11, 12 and 13 show cut-out structures 76', 80' and 82' respectively which are adapted for mounting as desired on appropriate tubular sections.

FIG. 7 shows another example of a blank 86 of suitable plastic material for providing the planar structures. In this example the central longitudinal bore 88 is partly open and is not a full circle in cross-section, but is a sufficient portion of one to snugly receive a tubular section. In addition, it extends above and below the plane of the sheet comprising the blank.

FIG. 8 shows an example of a blank 90 of suitable plastic material in which the central bore 92 is also an open one and not a full circle in cross-section. In this example, the base of the bore is flush with the plane of the blank and the bore extends from one surface thereof.

FIG. 9 shows a blank of suitable plastic material having a substantially centrally disposed row of spaced holes 84 therethrough along the longer dimension thereof. Holes 84 are chosen to have a diameter and respective spacing therebetween whereby a tubular section can be readily interwoven therethrough, the length of the spacing being chosen whereby each structure cut out from the blank, i.e., an orbital lobe representing structures such as structures 76′, 80′ and 82′, has at least two holes for interweaving a tubular section therethrough.

From the foregoing, it is seen that in accordance with the invention there is provided a molecular model which enables the representation of overlapping orbitals to show the existence of steric hindrance, i.e., a representation which cannot be effected with three-dimensional models. The principles of the invention can also be used to show anti-bonding lobes in excited molecules.

Because of their ease of construction and the simplicity and ready handling of the materials needed for their construction, the models lend themselves to many purposes such as study and research, teaching, explanation and the like.

While preferred embodiments of the invention have been shown and described herein, it is obvious that numerous additions, changes and omissions may be made therein without departing from the spirit and scope of the invention.

What is claimed is:

1. A molecular model assembly comprising a framework structure and planar orbital representing members adapted to be mounted upon said framework structure, said framework structure including a plurality of elongated cylindrical arm sections meeting at a central point representing the center of an atom and extending angularly outward from said central point in accordance with the symmetry axes of valence orbitals and bond angles of said atom, said cylindrical arm sections having respective inner color-coded portions of lengths representing to scale the convalent radius of said central atom, and outer color-coded portions of lengths representing to scale the covalent radii and Van der Waals radii of different atoms bonded to said central atom, said plannar members being flat and having surface configurations of the cross-sections of the orbital lobes of said different atoms, and means for rotatably mounting said planar members on said cylindrical arm sections, whereby said members may be rotated about said arm sections to determine the overlap of orbitals, said members having axial lengths substantially equal to said outer color-coded portions.

2. A molecular model assembly as defined in claim 1, wherein said planar members comprise a relatively thin, strong sheet material.

3. A molecular model assembly as defined in claim 2, wherein said planar members respectively have centrally disposed axially aligned bores therethrough for rotatably receiving therein said outer color-coded portions of said arm sections to provide a representation of a molecule in the ground state, wherein said members represent bonding lobes, each member having the same color as the arm section received therein.

4. A molecular model assembly as defined in claim 2, wherein said planar members respectively have bores therethrough laterally offset with respect to the axial midline of said members for rotatably receiving therein said outer color-coded portions of said arm sections to provide a representation of an excited molecule, wherein said members represent anti-bonding lobes, each member having the same color as the arm section received therein.

5. A molecular model assembly as defined in claim 1, wherein there are included further cylindrical arm sections extending from said central point at chosen angles and dimensioned according to scale to relatively precisely represent the symmetry axes of unshared electron pair orbitals of said central atom said further arm sections having the color of said inner color-coded portions and wherein there are included further planar members having surface configurations of cross-sections respectively of the orbital lobes of said unshared electron pairs, said further members having the same color as said further arm sections and having centrally disposed axially aligned bores therethrough respectively equal in length to said further arm sections for rotatably receiving said last named arm sections therein.

References Cited

UNITED STATES PATENTS

| | | | |
|---|---|---|---|
| 405,354 | 6/1889 | Hawk | 35—34 |
| 1,205,101 | 11/1916 | Meyer | 46—29 |
| 2,984,036 | 5/1961 | Adler. | |
| 2,996,832 | 8/1961 | Rubin | 46—31 X |
| 3,276,146 | 10/1966 | Epstein | 35—51 X |
| 3,333,349 | 8/1967 | Brumlik | 35—18 |

FOREIGN PATENTS 712,758    7/1965    Canada.

OTHER REFERENCES

Rosengren, Three-Dimensional Teaching Aids for Trade and Industrial Instruction, published by Office of Education of H.E.W. OE–84024 Circular No. 662 in 1961.

EUGENE R. CAPOZIO, Primary Examiner

H. S. SKOGQUIST, Assistant Examiner

U.S. Cl. X.R.

35—34, 51; 46—31